(12) United States Patent
Brensinger et al.

(10) Patent No.: US 11,060,318 B2
(45) Date of Patent: Jul. 13, 2021

(54) FABRIC HINGE

(71) Applicant: NEMO EQUIPMENT, INC., Dover, NH (US)

(72) Inventors: Camon Brensinger, Stratham, NH (US); Zackary Kamen, Newburyport, MA (US); Patrick McCluskey, Lee, NH (US)

(73) Assignee: Nemo Equipment, Inc., Dover, NH (US)

( * ) Notice: Subject to any disclaimer, the term of this patent is extended or adjusted under 35 U.S.C. 154(b) by 0 days.

(21) Appl. No.: 16/724,952

(22) Filed: Dec. 23, 2019

(65) Prior Publication Data

US 2020/0196745 A1   Jun. 25, 2020

Related U.S. Application Data

(62) Division of application No. 15/878,989, filed on Jan. 24, 2018, now Pat. No. 10,524,563.

(Continued)

(51) Int. Cl.
| | | |
|---|---|---|
| *E05D 1/00* | (2006.01) | |
| *E04H 15/54* | (2006.01) | |
| *A47B 3/083* | (2006.01) | |
| *A47B 13/08* | (2006.01) | |
| *A47B 3/08* | (2006.01) | |

(Continued)

(52) U.S. Cl.
CPC ............ *E04H 15/54* (2013.01); *A47B 3/002* (2013.01); *A47B 3/06* (2013.01); *A47B 3/083* (2013.01); *A47B 3/0803* (2013.01); *A47B 3/12* (2013.01); *A47B 13/003* (2013.01); *A47B 13/088* (2013.01); *A47B 37/04* (2013.01); *E04H 15/42* (2013.01); *F16B 12/44* (2013.01); *A47B 2003/0806* (2013.01); *A47B 2200/001* (2013.01); *A47B 2220/0072* (2013.01); *F16B 2012/446* (2013.01); *Y10T 16/547* (2015.01)

(58) Field of Classification Search
CPC ... Y10T 16/525; Y10T 16/54; Y10T 16/5253; Y10T 16/548; E05D 1/00; E05D 1/02; E05D 9/005; E05D 7/00; B29L 2031/22; B29C 51/00; B29C 65/70; B29C 65/30; B29C 66/71; B29C 66/712; B29K 2105/06; B29K 2105/089; F16C 11/12
See application file for complete search history.

(56) References Cited

U.S. PATENT DOCUMENTS 2,219,524 A * 10/1940 Lindley ..................... E05D 1/02
                                                   217/57
2,241,101 A *  5/1941 Teeter .................... F25D 23/026
                                                   160/231.2

(Continued)

FOREIGN PATENT DOCUMENTS

GB          1007683 A  * 10/1965  ............... E05D 1/02

*Primary Examiner* — Chuck Y Mah
(74) *Attorney, Agent, or Firm* — Bourque & Assoc PA

(57) ABSTRACT

A foldable fabric hinge comprises a fabric portion having a first end and a second end. The foldable fabric hinge further comprises first and second fabric portion holders, wherein each of the first and second fabric portion holders is configured for gripping a respective one of the first and second fabric portion ends. A plurality of fasteners are configured for facilitating assembly of the first and second fabric portion holders and the fabric portion to first and second components requiring a hingeable connection.

16 Claims, 4 Drawing Sheets

Related U.S. Application Data

(60) Provisional application No. 62/449,818, filed on Jan. 24, 2017.

(51) Int. Cl.
| | |
|---|---|
| *A47B 3/06* | (2006.01) |
| *F16B 12/44* | (2006.01) |
| *A47B 3/12* | (2006.01) |
| *A47B 37/04* | (2006.01) |
| *A47B 13/00* | (2006.01) |
| *E04H 15/42* | (2006.01) |
| *A47B 3/00* | (2006.01) |

(56) References Cited

U.S. PATENT DOCUMENTS

| | | | | |
|---|---|---|---|---|
| 2,526,129 | A * | 10/1950 | Groesbeck | E05D 1/02 |
| | | | | 16/225 |
| 2,538,429 | A * | 1/1951 | Schantz | B60J 5/06 |
| | | | | 160/206 |
| 2,607,411 | A * | 8/1952 | Van Vliet | E05D 1/02 |
| | | | | 160/231.2 |
| 3,441,975 | A * | 5/1969 | Shepherd | E05D 1/02 |
| | | | | 16/225 |
| 4,282,919 | A * | 8/1981 | Teno | E06B 9/17015 |
| | | | | 160/23.1 |
| 4,327,474 | A * | 5/1982 | Holden | B61F 5/32 |
| | | | | 156/222 |
| 4,487,144 | A * | 12/1984 | Bianchi | D05B 77/00 |
| | | | | 112/260 |
| 4,619,304 | A * | 10/1986 | Smith | G09F 15/0068 |
| | | | | 160/135 |
| 4,958,671 | A * | 9/1990 | Bove | A47G 5/00 |
| | | | | 160/135 |
| 5,539,955 | A * | 7/1996 | Wiese | E05D 1/02 |
| | | | | 16/225 |
| 5,644,384 | A * | 7/1997 | O'Neil | G03B 27/04 |
| | | | | 355/122 |
| 5,941,480 | A * | 8/1999 | Wille | B64C 3/48 |
| | | | | 244/131 |
| 5,945,053 | A * | 8/1999 | Hettinga | E05D 1/02 |
| | | | | 264/171.13 |
| 6,175,989 | B1 * | 1/2001 | Carpenter | B64G 1/222 |
| | | | | 136/245 |
| 7,582,345 | B2 * | 9/2009 | Priegelmeir | B32B 1/04 |
| | | | | 428/60 |
| 8,438,702 | B2 * | 5/2013 | Apgar | B32B 25/10 |
| | | | | 16/225 |
| 8,973,461 | B2 * | 3/2015 | Gosselin | B25J 13/02 |
| | | | | 74/490.05 |
| 9,797,439 | B2 * | 10/2017 | Masini | E05D 1/00 |
| 10,544,610 | B2 * | 1/2020 | Malia | B29C 66/71 |
| 2012/0150309 | A1 * | 6/2012 | Marissen | F16C 11/12 |
| | | | | 623/21.15 |
| 2013/0276266 | A1 * | 10/2013 | Pendarvis | E05D 1/02 |
| | | | | 16/225 |
| 2017/0044808 | A1 * | 2/2017 | Liao | E05D 1/02 |
| 2019/0264482 | A1 * | 8/2019 | Malia | B29C 66/1226 |
| 2020/0386023 | A1 * | 12/2020 | Larson | B29C 45/14336 |

\* cited by examiner

FABRIC HINGE

CROSS-REFERENCE TO RELATED APPLICATIONS

This application is a Divisional Application of U.S. patent application Ser. No. 15/878,989 titled "SMALL TABLE FRAME", which was filed on Jan. 24, 2018 and which claims priority from U.S. Provisional Patent Application No. 62/449,818 filed on Jan. 24, 2017 and titled "OUTDOOR EQUIPMENT 2016", both of which are incorporated fully herein by reference.

TECHNICAL FIELD

The present invention relates to foldable hinges useful for foldably connecting together various items and objects.

BACKGROUND INFORMATION

A large portion of the population enjoy camping and other outdoor activities. When engaged in these activities, however, many people enjoy some of the comforts of home. This includes a table or other surface which can be used to prepare food, serve food or on which to place various objects including cook stoves and the like for use during outdoor activities.

Although individuals engaged in the activities enjoy such comforts of home, weight, space and collapsibility is still an important feature. If the table or other foldable object is structure is not able to be folded and stored in a small area and if it is too heavy, its usefulness will be lost to campers and outdoor enthusiasts.

Accordingly, what is needed is a foldable lightweight hinge mechanism which allows a table or other object to be folded for purposes of packing it to the outdoor area but which can be folded to form a multipurpose, useful object such as a table.

Furthermore, what is needed is a hinge, which unlike conventional hinges such as butt, barrel, piano, butterfly and others, does not protrude above the surface of the unfolded or folded object. In other words, if a table surface is to be made of hinged panels, the ideal design would not have hinges interrupting the smooth surface of the table or extending its packed dimensions. Such protruding hinges could tip wine glasses when in use as a table, or snag on fabric when stored in a transport case.

SUMMARY

The present disclosure features a foldable metal and fabric hinge. In accordance with an embodiment of the present invention, the foldable fabric hinge comprises a fabric portion having a first end and a second end. The foldable fabric hinge further comprises first and second fabric portion holders, wherein each the first and second fabric portion holders is configured for gripping a respective one of the first and second fabric portion ends. A plurality of fasteners are configured for facilitating assembly of the first and second fabric portion holders and the fabric portion to first and second components requiring a hingeable connection.

In one embodiment, each of the first and second fabric portion holders comprises a top piece and a bottom piece, wherein first and second ends of the fabric portion are configured to be disposed between the top and bottom piece of each of the respective first and second fabric portion holders. The top piece and the bottom piece are interlocking with one another.

In another embodiment, one of the top piece and the bottom piece of each of the first and second fabric portion holders includes a plurality of depressions, and the other of the top piece and the bottom piece includes a plurality of ridges, wherein the plurality of ridges have a configuration complementary to that of the plurality of depressions and located and configured to mate with the plurality of depressions.

Furthermore, one of the top piece and the bottom piece of each of the first and second fabric portion holders may include at least one protrusion, and the other one of the top piece and the bottom piece includes at least one hole located and configured to mate with the at least one protrusion.

In a further embodiment, the fabric portion includes at least one hole. The at least one protrusion and the at least one hole on the top and bottom pieces of at least one of the first and second fabric portion holders align with the at least one hole on the fabric portion in an assembled configuration thereof. Each of the first and second fabric portion holders are flush mount fitted onto the first and second components requiring a hingeable connection and are held in a fixed position by means of the plurality of fasteners.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 2:
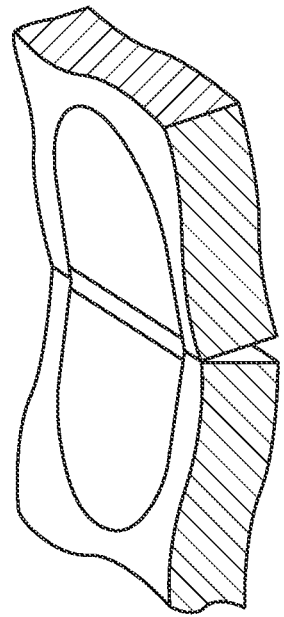
FIGS. 1 through 4 illustrate various operational modes of the fabric hinge according to one feature of the present invention.
Figure 4:
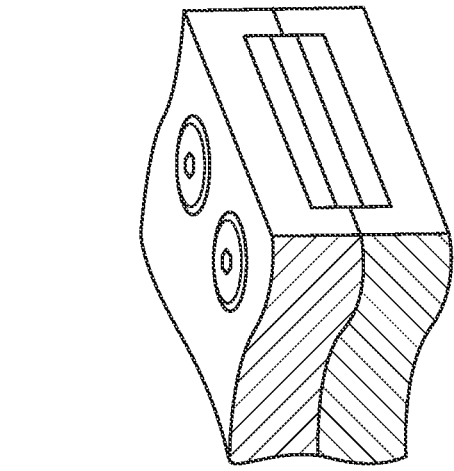
Figure 1:
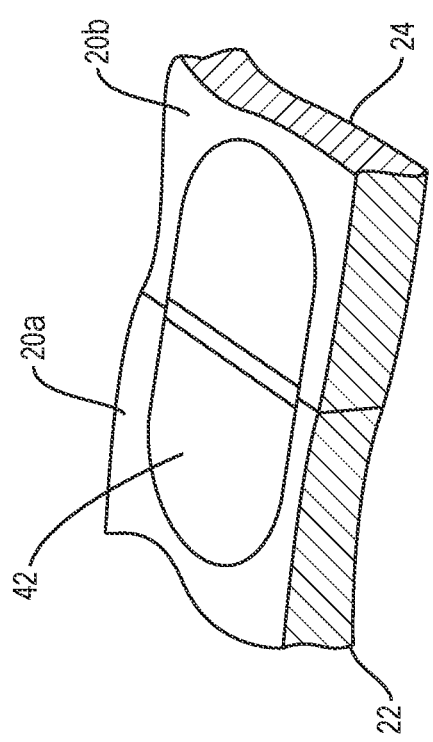
Figure 3:
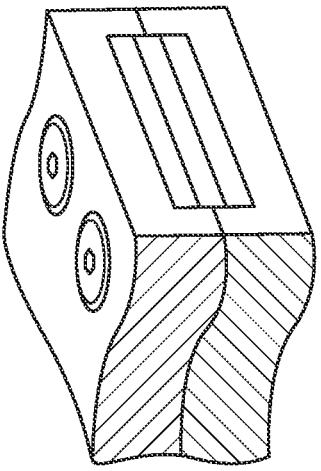
Figure 5:
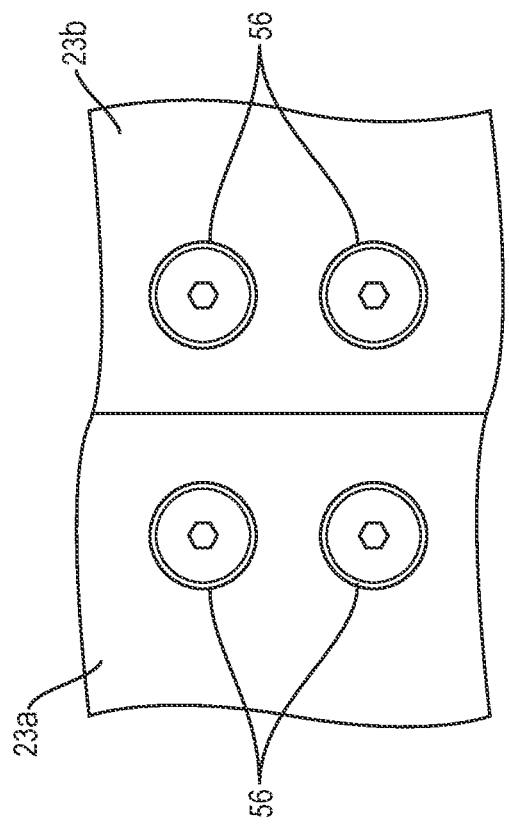
FIGS. 5 through 7 are a top, bottom and cross-sectional side view respectively illustrating the fabric hinge according to the present invention.
Figure 6:
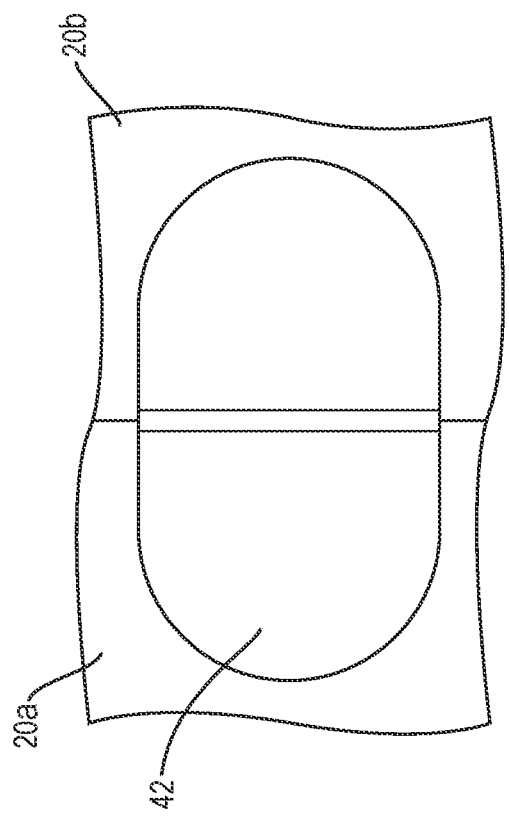
Figure 7:
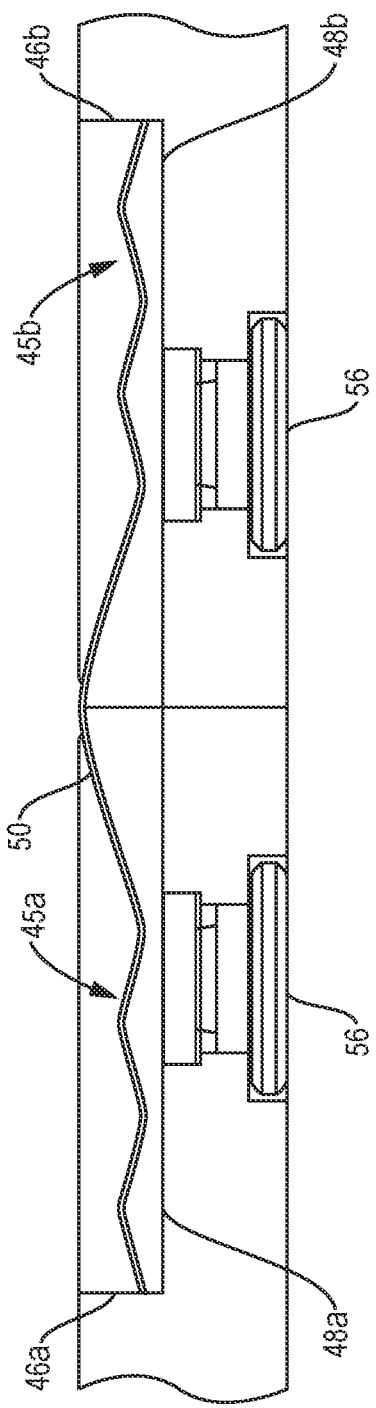

The present invention includes, in one embodiment, a foldable hinge wherein the hinge portion is made of a fabric material or member. The foldable hinge 42, FIGS. 1-4 provides a flush mounted hinge element. The fabric hinge 42 may be utilized in connection with a foldable table or similar device or alternatively, is useful on its own in any situation where two abutting members 22, 24 must be provided with a flush mounting hinge, wherein the 2 abutting numbers 22, 24 must be foldably connected with their abutting edges 12, 14 essentially abutting and in very close proximity to one another, and the top surfaces 20a, 20b of the two abutting members 22, 24 are maintained flush with the hinge member when the foldable hinge 42 is in an unfolded position forming an essentially continuous surface. As shown in cross-sectional side view in FIG. 7 and as will be explained in greater detail below, the actual hinge portion 44 is made out of fabric or fabric-like material. Examples of appropriate materials for the hinge portion include but is not limited to hypalon fabric which, is extremely durable and abrasion resistant and does not stretch and resists twisting.

Figure 8B:
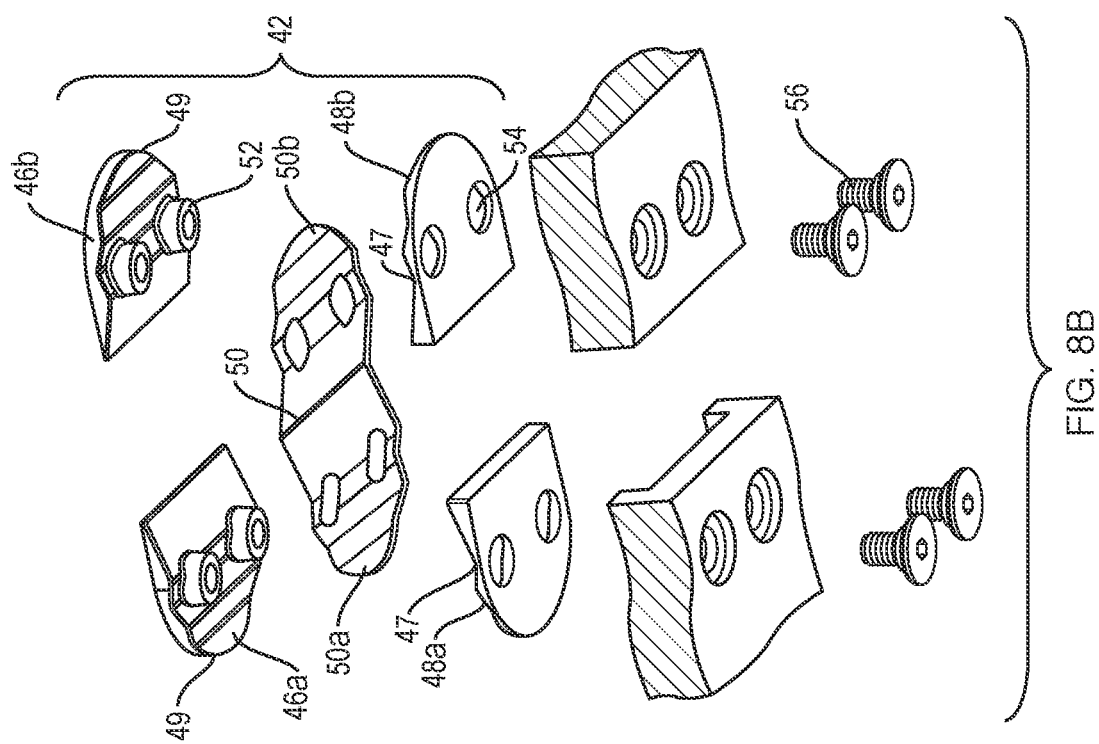
FIGS. 8A and 8B are exploded views of the fabric hinge according to the present invention configured for being mounted in a piece of bamboo material.
Figure 8A:
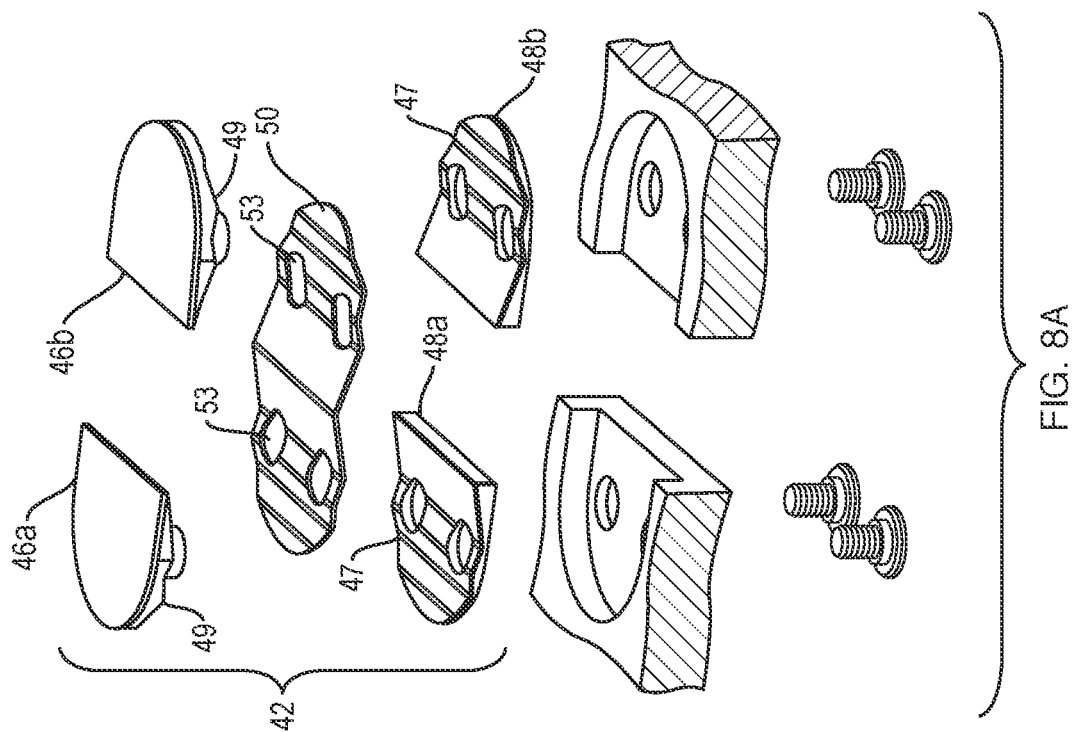

Exploded views of the foldable fabric hinge 42 are shown in greater detail in FIGS. 8A and 8B. Each hinge includes first and second fabric portion holders 45a, 45b. Each of the first and second fabric portion holders 45a, 45b comprises top pieces 46a and 46b and bottom pieces 48a and 48b. The hinge 42 further comprises a high strength fabric hinge portion 50.

The fabric portion 50 has first and second ends 50a, 50b. The first and second fabric portion holders 45a, 45b are configured for gripping a respective one of the first and second fabric portion ends 50a, 50b. More specifically, the first and second ends 50a, 50b of the fabric portion are configured to be disposed between the top and bottom pieces 46a and 46b, as well as 48a and 48b of each of the respective first and second fabric portion holders 45a, 45b.

One of the top piece 46a, 46b and the bottom piece 48a, 48b of each of the first and second fabric portion holders 45a, 45b includes a plurality of depressions 47, and the other of the top piece 46a, 46b and the bottom piece 48a, 48b includes a plurality of ridges 49, wherein the plurality of ridges 49 have a configuration complementary to that of the plurality of depressions 47 and located and configured to mate and interlock with the plurality of depressions 47.

Figure 10:
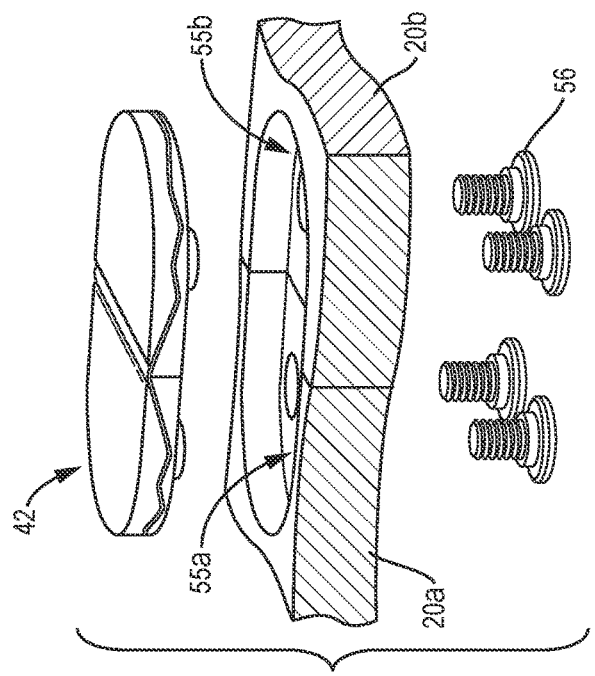
FIGS. 9, 10 and 11 are bottom, plan and side views respectively of the fabric hinge according to the present invention configured for being mounted in a piece of bamboo or other similar material.
Figure 9:
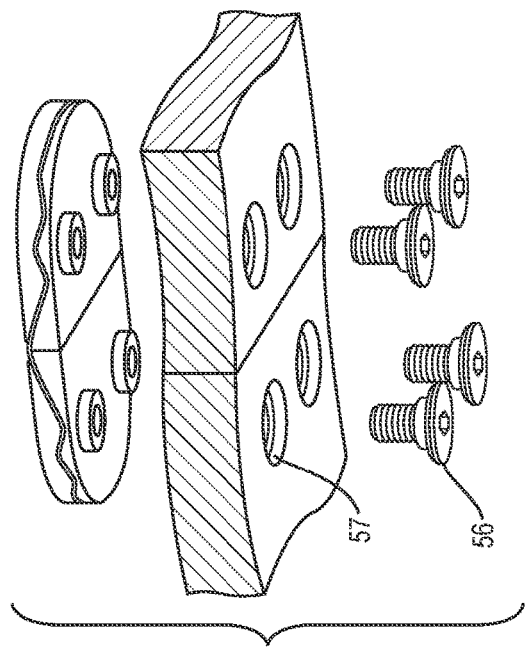
Figure 11:
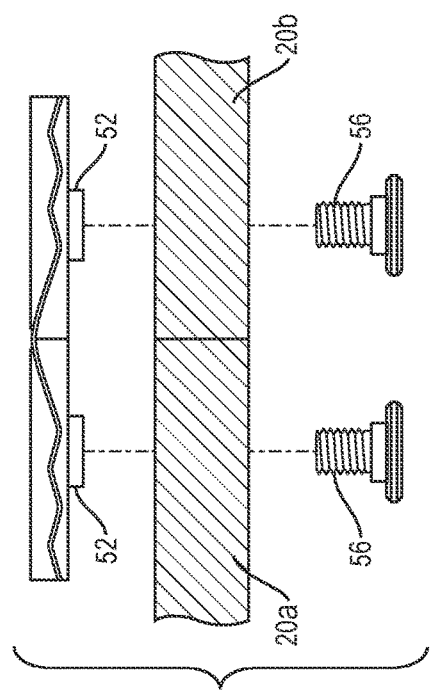

The fabric hinge portion 50 includes a plurality of holes 53 which interconnect with the protrusions 52 on the bottom of the first and second top pieces 46a and 46b and holes 54 in the first and second bottom pieces 48 and through which low-profile screws 56 will pass and thread into the protrusions 52 on the bottom of the first and second top pieces 46. In an alternate embodiment, protrusions 52 can be configured on bottom pieces and holes can be configured on the top pieces. An assembled hinge just prior to insertion into first and second pieces to be joined together by a flexible hinge is shown in FIGS. 9-11. The fabric hinge may be utilized in connection with a foldable table or alternatively, is useful on its own in any situation where two abutting members must be provided with a flush mounting hinge wherein the 2 abutting members must be foldably connected with their abutting edges in very close proximity to one another and the top and bottom surfaces flush with the hinge member.

Modifications and substitutions by one of ordinary skill in the art are considered to be within the scope of the present invention, which is not to be limited except by the allowed claims and their legal equivalents.

The invention claimed is:

1. A flexible hinge, said flexible hinge configured for being positioned into a first folded position and a second unfolded position, wherein said flexible hinge is configured for being flush mount fitted into a top surface of first and second components requiring a hingeable connection and held in a fixed position adjacent one another by means of a plurality of fasteners, said flexible hinge comprising:
  a flexible hinge forming portion having a first end and a second end;
  first and second flexible hinge forming portion holders, wherein said first and second flexible hinge forming portion holders are configured for gripping a respective one of said first and second flexible hinge forming portion first and second ends, wherein said first and second components requiring a hingeable connection each include an adjacent and parallel edge, and wherein in said second unfolded position, said flexible hinge forming portion is configured to maintain said adjacent edges of said first and second components requiring a hinge connection adjacent to and parallel with one another, and wherein said first and second components requiring a hingeable connection each include a top surface and wherein in said second unfolded position, said flexible hinge forming portion bridges between said adjacent and parallel edges of said first and second components requiring a hinge connection, wherein each of said first and second flexible hinge forming portion holders comprises a top piece and a bottom piece, and wherein each of said top pieces includes a wedge shaped end portion terminating in a thin end portion, said thin end portion of said top pieces configured for being held in position parallel to and adjacent one another and a parallel to said parallel edges of said first and second components requiring a hinge connection, and wherein each of said bottom pieces includes a wedge shaped end portion terminating in a thick end portion, said thick end portion of said bottom pieces configured for being held in position parallel to and adjacent one another and parallel to and confronting said thin end portions of said respective first and second top pieces and parallel to said parallel edges of said first and second components requiring a hinge connection, wherein each of said cop and bottom pieces of said first and second flexible hinge forming portion holders are configured for gripping a respective one of said first and second flexible hinge forming portion first and second ends, and wherein said top pieces of said first and second flexible hinge forming portion holders are configured, when assembled, to said bottom pieces of said first and second flexible hinge forming portion holders and said flexible hinge forming portion for providing a top surface of said first and second flexible hinge forming portion holders gripping said flexible hinge forming portion that is planer with said top surface of said first and second components requiring a hingeable connection; and
  a plurality of fasteners, configured for facilitating assembly of said top and bottom pieces of said first and second flexible hinge forming portion holders gripping a respective one of said first and second flexible hinge forming portion first and second ends to said first and second components requiring a hingeable connection, so as to provide said top surface of said flexible hinge that is planer with said top surface of said first and second components requiring a hingeable connection.

2. The flexible hinge according to claim 1, wherein said top piece and said bottom piece are interlocking with one another.

3. The flexible hinge according to claim 2, wherein one of said top piece and said bottom piece of each of said first and second flexible hinge forming portion holders include a plurality of depressions, and wherein the other of said top piece and said bottom piece includes a plurality of ridges, wherein said plurality of ridges have a configuration complementary to that of said plurality of depressions and located and configured to mate with said plurality of depressions.

4. The foldable flexible hinge according to claim 1, wherein one of said top piece and said bottom piece of each of said first and second flexible hinge portion holders includes at least one protrusion, and the other one of said top piece and said bottom piece includes at least one hole located and configured to mate with said at least one protrusion.

5. The flexible hinge according to claim 4, wherein said flexible hinge forming portion includes at least one hole.

6. The flexible hinge according to claim 5, wherein said at least one protrusion and said at least one hole on said top and bottom pieces of at least one of said first and second foldable flexible hinge forming portion holders align with said at least one hole on said flexible hinge forming portion in an assembled configuration thereof.

7. The flexible hinge according to claim 1, wherein each of said first and second flexible hinge forming portion holders are flush mount fitted onto said first and second components requiring a hingeable connection and are held in a fixed position by means of said plurality of fasteners.

8. The flexible hinge according to claim 1, wherein said flexible hinge forming portion comprises a high strength fabric hinge forming portion.

9. A foldable flexible hinge, said foldable flexible hinge configured for being positioned into a first folded position and a second unfolded position, wherein said foldable flexible hinge is configured for being flush mount fitted into a top surface of first and second components requiring a hingeable connection and held in a fixed position adjacent to and parallel with one another by means of a plurality of fasteners, said foldable flexible hinge comprising:
 a foldable flexible hinge forming portion having a first end and a second end; and
 first and second foldable flexible hinge forming portion holders, each said first and second foldable flexible hinge forming portion holders configured for gripping a respective one of said first and second foldable flexible hinge forming portion first and second ends, wherein each of said first and second foldable flexible hinge forming portion holders comprises a top piece and a bottom piece interlocking with one another and gripping a respective one of said first and second foldable flexible hinge forming portion first and second ends, wherein said first and second components requiring a hingeable connection each include an adjacent and parallel edge, and wherein in said second unfolded position, said foldable flexible hinge forming portion is configured for maintaining said adjacent edges of said first and second components requiring a hingeable connection adjacent to and parallel with one another, and wherein said first and second components requiring a hingeable connection each include a top surface and wherein in said second unfolded position, said foldable flexible hinge forming portion bridges between said adjacent edges of said first and second components requiring a hingeable connection, wherein each of said first and second flexible hinge forming portion holders comprises a top piece and a bottom piece, and wherein each of said top pieces includes a wedge shaped end portion terminating in a thin end portion, said thin end portion of said top pieces configured for being held in position parallel to and adjacent one another and parallel to said parallel edges of said first and second components requiring a hinge connection, and wherein each of said bottom pieces includes a wedge shaped end portion terminating in a thick end portion, said thick end portion of said bottom pieces configured for being held in position parallel to and adjacent one another and parallel to and confronting said thin end portions of said, respective first and second top pieces and parallel to said parallel edges of said first and second components requiring a hinge connection, wherein each of said top and bottom, pieces of said first and second flexible hinge forming portion, holders are configured for gripping a respective one of said first and second flexible hinge forming portion first and second ends, and wherein said top pieces of said first and second flexible hinge forming portion, holders are configured, when assembled to said bottom, pieces of said first and second flexible hinge forming portion holders and said flexible hinge forming portion, for providing a top surface of said first and second flexible hinge forming portion holders gripping said flexible hinge forming portion that is planer with, said top surface of said first and second components requiring a hingeable connection.

10. The foldable flexible hinge according to claim 9, wherein one of said top piece and said bottom piece of each of said first and second foldable flexible hinge forming portion holders includes a plurality of depressions, and the other of said top piece and said bottom piece includes a plurality of ridges, wherein said plurality of ridges have a configuration complementary to that of said plurality of depressions and located and configured to mate with said plurality of depressions.

11. The foldable flexible hinge according to claim 9, wherein one of said top piece and said bottom piece of each of said first and second fabric portion holders includes at least one protrusion, and the other one of said top piece and said bottom piece includes at least one hole located and configured to mate with said at least one protrusion.

12. The foldable flexible hinge according to claim 11, wherein said foldable flexible hinge forming portion includes at least one hole.

13. The foldable flexible hinge according to claim 12, wherein said at least one protrusion and said at least one hole on said top and bottom pieces of at least one of said first and second foldable flexible hinge forming portion holders align with said at least one hole in said foldable flexible hinge forming portion in an assembled configuration thereof.

14. The foldable flexible hinge according to claim 9, wherein each of said first and second flexible hinge forming portion holders are flush mount fitted into a top surface of said first and second components requiring a hingeable connection and are held in a fixed position by means of a plurality of fasteners.

15. A foldable flexible hinge comprising:
 a flexible hinge forming portion having a first end and a second end and at least one hole disposed therein;
 first and second flexible hinge forming portion holders, each of said first and second flexible hinge forming portion holders configured for gripping a respective one of said first and second flexible hinge forming portion ends, wherein:
  each of said first and second flexible hinge forming portion holders comprises a top piece and a bottom piece, and wherein first and second ends of said flexible hinge forming portion are configured to be disposed between said top and bottom piece of each of said respective first and second flexible hinge forming portion holders, wherein said top piece and said bottom piece are configured for interlocking with one another;
  wherein one of said top piece and said bottom piece of each of said first and second flexible hinge forming portion holders includes a plurality of depressions, and the other of said top piece and said bottom piece includes a plurality of ridges, wherein said plurality of ridges have a configuration complementary to that of said plurality of depressions and are located and configured to mate with said plurality of depressions;
  wherein one of said top piece and said bottom piece of each of said first and second flexible hinge forming portion holders includes at least one protrusion, and the other one of said top piece and said bottom piece includes at least one hole located and configured to mate with said at least one protrusion; and wherein said at least one protrusion and said at least one hole on said top and bottom pieces of at least one of said first and second flexible hinge forming portion holders align with said at least one hole in said flexible hinge forming portion in an assembled configuration thereof;

a plurality of fasteners, configured for facilitating assembly of said first and second flexible hinge forming portion holders and said flexible hinge forming portion to first and second components requiring a hingeable connection; and wherein each of said first and second flexible hinge forming portion holders are flush mount fitted onto said first and second components requiring a hingeable connection and are held in a fixed position by means of said plurality of fasteners.

16. A flexible hinge comprising:

a flexible hinge forming portion having a first end and a second end;

first and second flexible hinge forming portion holders, each of said first and second flexible hinge forming portion holders configured for gripping a respective one of said first and second flexible hinge forming portion ends, wherein each of said first and second flexible hinge forming portion holders comprises a top piece and a bottom piece, and wherein first and second ends of said flexible hinge forming portion are configured to be disposed between said top and bottom piece of each of said respective first and second flexible hinge forming portion holders, wherein said top piece and said bottom piece are interlocking with one another such that wherein one of said top piece and said bottom piece of each of said first and second flexible hinge forming portion holders includes a plurality of depressions, and the other of said top piece and said bottom piece includes a plurality of ridges, wherein said plurality of ridges have a configuration complementary to that of said plurality of depressions and located and configured to mate with said plurality of depressions; and a plurality of fasteners, configured for facilitating assembly of said first and second flexible hinge forming portion holders and said flexible hinge forming portion to first and second components requiring a hingeable connection.

* * * * *